United States Patent
Commaret et al.

(10) Patent No.: US 11,300,296 B2
(45) Date of Patent: Apr. 12, 2022

(54) COMBUSTION CHAMBER OF A TURBOMACHINE

(71) Applicant: SAFRAN AIRCRAFT ENGINES, Paris (FR)

(72) Inventors: Patrice André Commaret, Moissy-Cramayel (FR); Haris Musaefendic, Moissy-Cramayel (FR); Romain Nicolas Lunel, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 126 days.

(21) Appl. No.: 16/428,326

(22) Filed: May 31, 2019

(65) Prior Publication Data

US 2019/0368740 A1    Dec. 5, 2019

(30) Foreign Application Priority Data

Jun. 4, 2018 (FR) ...................................... 1854833

(51) Int. Cl.
  *F23R 3/46*   (2006.01)
  *F02C 7/22*   (2006.01)
  (Continued)

(52) U.S. Cl.
  CPC .................. *F23R 3/46* (2013.01); *F02C 7/22* (2013.01); *F02C 9/16* (2013.01); *F23R 3/283* (2013.01); *F05D 2220/32* (2013.01)

(58) Field of Classification Search
  CPC ...... F23R 3/46; F23R 3/04; F23R 3/06; F23R 3/002; F23R 3/50; F23R 3/283;
  (Continued)

(56) References Cited

U.S. PATENT DOCUMENTS

| 4,934,145 A | 6/1990 | Zeisser |
| 5,396,759 A | 3/1995 | Richardson |

(Continued)

FOREIGN PATENT DOCUMENTS

| EP | 0724119 A2 | 7/1996 |
| EP | 1271059 A2 | 1/2003 |

(Continued)

OTHER PUBLICATIONS

Rapport de Recherche Préliminaire et Opinion Écrite mailed Oct. 12, 2018, issued in corresponding French Application No. 1854833 filed Jun. 4, 2018, 6 pages.

*Primary Examiner* — Todd E Manahan
*Assistant Examiner* — Thuyhang N Nguyen
(74) *Attorney, Agent, or Firm* — Christensen O'Connor Johnson Kindness PLLC

(57) ABSTRACT

An annular combustion chamber of a turbomachine is described. The combustion chamber has an axis of revolution and is delimited by coaxial internal and external annular walls joined upstream by a bottom of chamber substantially transverse to the walls. In some embodiments, the chamber includes at least one annular deflector placed in the chamber and substantially parallel to the bottom of chamber. The bottom of chamber may have openings adapted to be traversed by air for cooling the deflector. In some embodiments, the bottom of chamber and the deflector include mounting openings for mounting an annular row of injection devices for injecting a mixture of air and fuel into the chamber. At least a portion of the air for cooling the deflector is conveyed into the chamber through holes in the injection devices.

13 Claims, 2 Drawing Sheets

(51) Int. Cl.
*F02C 9/16* (2006.01)
*F23R 3/28* (2006.01)

(58) Field of Classification Search
CPC ...... F23R 3/14; F23R 3/60; F02C 7/22; F02C 7/222; F02C 7/28
See application file for complete search history.

(56) References Cited

U.S. PATENT DOCUMENTS

| | | | | |
|---|---|---|---|---|
| 5,894,732 A | * | 4/1999 | Kwan | F23R 3/283 60/748 |
| 5,941,076 A | * | 8/1999 | Sandelis | F23R 3/10 60/752 |
| 8,683,806 B2 | | 4/2014 | Commaret et al. | |
| 10,533,442 B2 | * | 1/2020 | Maleki | F01D 11/005 |
| 2003/0000217 A1 | * | 1/2003 | North | F23R 3/04 60/772 |
| 2007/0125085 A1 | * | 6/2007 | Commaret | F23R 3/14 60/748 |
| 2009/0013694 A1 | * | 1/2009 | Hernandez | F23R 3/50 60/752 |
| 2017/0009986 A1 | * | 1/2017 | Patel | F23R 3/60 |

FOREIGN PATENT DOCUMENTS

| | | |
|---|---|---|
| EP | 2012061 A1 | 1/2009 |
| EP | 2728263 A1 | 5/2014 |
| FR | 2637675 A1 | 4/1990 |
| GB | 2296084 A | 6/1996 |
| WO | 2014/052965 A1 | 4/2014 |

* cited by examiner

COMBUSTION CHAMBER OF A TURBOMACHINE

TECHNICAL FIELD

Embodiments of the present disclosure relate to an annular combustion chamber of a turbomachine.

BACKGROUND

A turbomachine includes a gas generator with one or more compressors, for example, a low pressure compressor and a high pressure compressor, located upstream of a combustion chamber.

By convention, in the present disclosure, the terms "upstream" and "downstream" are defined in relation to the direction of gas flow in the turbomachine. Similarly, by convention in the present disclosure, the terms "internal" and "external" are defined radially with respect to the longitudinal axis of the turbomachine, which is the axis of rotation of the compressor rotors.

The combustion chamber is annular with an axis C of revolution and placed in an annular enclosure radially delimited by an external annular casing and an internal annular casing. The combustion chamber is delimited by coaxial internal and external annular walls joined upstream by a chamber bottom, also annular, and substantially transverse.

In particular, the combustion chamber is supplied with compressed air, for example, coming from a high-pressure compressor arranged upstream of the combustion chamber via an annular diffuser, and, in some embodiments, injected with fuel via injection devices distributed angularly about the axis C. The combustion of the air/fuel mixture is initiated by an ignition device and generates heat radiation towards the bottom of the chamber. This subjects the bottom of the chamber to high temperatures. To protect the chamber bottom, at least one annular deflector, also called a heat shield, is placed in the combustion chamber facing the bottom in a substantially parallel manner, and at a short distance from the bottom. The annular deflector is generally sectored and formed by a plurality of deflector sectors distributed angularly around the axis C, as illustrated in documents EP 0 724 119 A2 and GB 2 296 084.

The deflector sectors are cooled by the impact of cooling air from air jets. The cooling air also is piped from the high-pressure compressor and enters the combustion chamber through cooling openings provided in the chamber bottom.

Thus, the cooling air from the deflector sectors, flowing from upstream to downstream, passes through the chamber bottom through the cooling openings and then impacts the deflector sectors. The air is then guided radially into and out of the chamber to initiate a film of cooling air on each of the internal and external walls that flows from upstream to downstream.

Although this architecture allows the internal and external walls to cool slightly on an upstream portion of the chamber, it does create some difficulties, particularly when the turbomachine is operating at idle speed.

For example, at an idle speed, the cooling air film traps fuel and a quantity of fuel, usually hydrocarbons, is unburned, at the detriment of combustion efficiency.

The prior art also includes documents EP-A1-2012061, EP-A1-2728263, EP-A2-1271059, EP-A2-0724119 and WO-A1-2014/052965.

Embodiments of the present disclosure aim to overcome the above-mentioned disadvantage.

SUMMARY

For this purpose, the present disclosure proposes an annular combustion chamber, with an axis C of revolution, of a turbomachine delimited by coaxial internal and external annular walls joined upstream by a bottom of chamber substantially transverse to the walls. The chamber further comprises at least one annular deflector placed in the chamber and substantially parallel to the bottom of chamber. The bottom of chamber may have openings adapted to be traversed by air for cooling by impact the deflector, the bottom of chamber and the deflector having mounting openings for mounting an annular row of devices for injecting a mixture of air and fuel into the chamber. In an embodiment, at least part of the air for cooling the deflector is conveyed into the chamber through holes made in the injection devices.

The cooling air from the deflector is reused in the injection devices and may improve a fuel mixture and optimize the shape and dimensions of the air-fuel cone injected into the chamber. This may benefit the combustion efficiency and, more generally, the turbomachine.

In the prior art, air introduced in the form of a film is lost from the point of view of combustion. In the form of a film, the air will only have a contribution related to chemical reactions. The present disclosure proposes to reuse the air and inject the air into the injection system.

The chamber according to the present disclosure may include one or more of the following characteristics, either individually or in some combination thereof:
- the deflector is fixed in a sealed manner to the internal and external walls; such an assembly may effectively cool the deflector without initiating a cooling film on each of the internal and external walls,
- the deflector is sectored and includes a plurality of sectors distributed angularly about the axis C, the sectors being joined in a sealed manner to each other;
- each deflector sector is fixed in a sealed manner to the internal and external walls via an internal blade and an external blade respectively, the internal blade engaged in a groove formed on the external surface of the internal wall and an internal housing of the sector of deflector, and the external blade engaged in a groove formed on the internal surface of the external wall and an external housing of the sector of deflector;
- a first deflector sector is fixed in a sealed manner to an adjacent second deflector sector via a radial tongue, the tongue engaged in radial grooves of the first and second deflector sectors;
- the internal and external blades are produced in one piece with the tongue to form a monobloc assembly;
- at least some of the cooling air conveying holes of each injection device have a substantially radial orientation with respect to an axis of this device;
- at least some of the cooling air conveying holes of each injection device have an inclined orientation with respect to an axis of this device;
- each injection device includes a first means for centering a fuel injector, second means for injecting air and third means for diffusing an air-fuel mixture, the third means including a frustoconical bowl flared downstream and drilled with the holes;
- the third means includes a cylindrical wall which passes through the openings of the bottom of chamber and of the deflector, and which extends around the bowl of the third means to define with it an annular cavity which is in fluid communication on one side with channels for supplying air for cooling the deflector and on the other side with the holes;

the cylindrical wall is traversed by drillings extending axially in the thickness of the wall and opening facing an external annular flange located at a downstream end of greater diameter of the bowl;

the annular cavity is closed at its axial ends;

the channels extend between the cavity and a space between the bottom of chamber and the deflector.

A second subject of the disclosure is a turbomachine comprising a combustion chamber as described above.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in the present disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
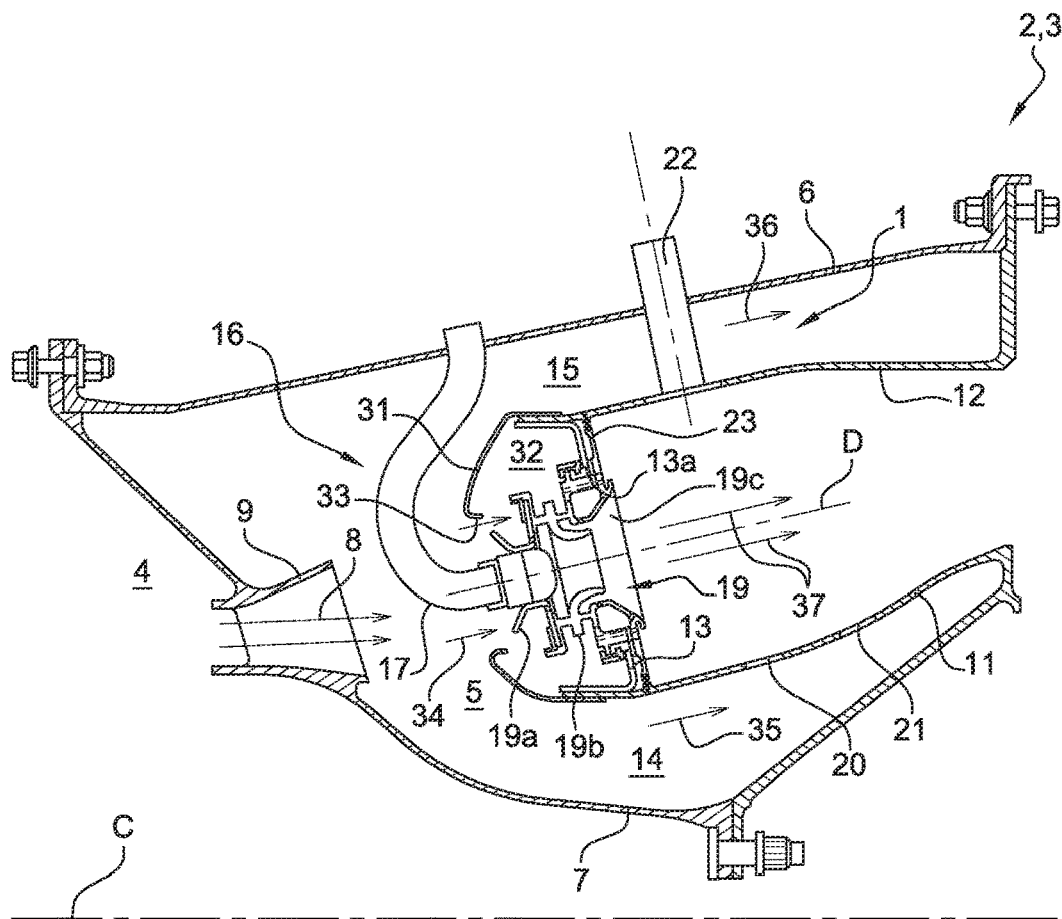
FIG. 1 is a detailed view of a longitudinal half-section of a turbomachine, showing an example of a combustion chamber of the turbomachine.

FIG. 1 shows an annular combustion chamber 1, with an axis C of rotation, of a gas generator of an aircraft turbomachine. The Combustion chamber 1 is downstream of one or more compressors, for example a low pressure compressor and a high pressure compressor, and upstream of one or more turbines, for example a low pressure turbine and a high pressure turbine.

In the embodiment shown, the axis C of rotation of the combustion chamber 1 coincides with the longitudinal axis of the turbomachine 3, which is also the axis of rotation of the compressors and turbines.

According to an embodiment illustrated in the figures, and in particular FIG. 1, the combustion chamber 1 is placed downstream of a high-pressure compressor 4. For example, the chamber 1 is located in an annular enclosure 5 radially delimited by an external annular casing 6 and an internal annular casing 7. A compressed air flow, illustrated by lines 8, generated by the compressor 4 flows into the annular enclosure 5 through an annular diffuser 9.

The combustion chamber 1 is delimited by coaxial internal and external annular walls 11, 12. The coaxial internal and externals walls 11, 12 are joined upstream by a bottom 13 of the combustion chamber 1, which may be substantially transverse to the walls 11 and 12.

For example, according to an embodiment illustrated in the figures, the combustion chamber 1 is substantially radially-centered in the annular enclosure 5 and defines, on a first side, an annular internal air passage 14, radially delimited by the internal wall 11 and the internal casing 7, and, on the second side, an annular external air passage 15, radially delimited by the external wall 12 and the external housing 6.

The combustion chamber 1 is supplied with a mixture of air and fuel by several fuel injection devices 16. The fuel injection devices 16 may be distributed angularly and evenly around the axis C. In some embodiments, each injection device 16 may include an injector 17 and a mixer 19.

The injector 17 may be angled with one end attached to the external housing 6 and an opposite end forming a head engaged and centered in the mixer 19.

The mixer 19 may be fixed on the bottom 13 of the combustion chamber 1. In some embodiments, the mixer 19 may be mounted in an opening 13a of the bottom 13. This may allow the air and fuel mixture to be sprayed into the combustion chamber 1.

The mixer 19 includes, from upstream to downstream, means (e.g., casing) 19a for centering the injector head 17, means (e.g., injector) 19b for injecting air, and means (e.g., diffuser) 19c for diffusing an air-fuel mixture into the combustion chamber.

The combustion chamber 1 is thus supplied with mixed compressed air by the mixer 19, this mixed compressed air being mixed with the fuel supplied by injectors 17.

The combustion chamber 1 is also supplied with compressed air through primary holes 20 and dilution holes 21. The primary holes 20 may be positioned in a circumferential row on the internal wall 11 and external wall 12. The dilution holes 21 may be positioned ion a circumferential row on the internal wall 11 and external wall 12 downstream from the primary holes 20. The primary and dilution holes 20, 21 are supplied with air via the internal and external air passages 14, 15.

The combustion of the air/fuel mixture is initiated by one or more ignition devices 22 fixed on the external wall 12. In some embodiments, as shown, the ignition devices 22 are located longitudinally at the primary holes 20.

To cool the internal and external walls 11, 12 of the combustion chamber 1, the internal and external walls 11, 12 include a plurality of cooling holes. The cooling holes are generally inclined, distributed in the form of circumferential rows, to achieve a multi-perforation cooling affect.

Figure 2:
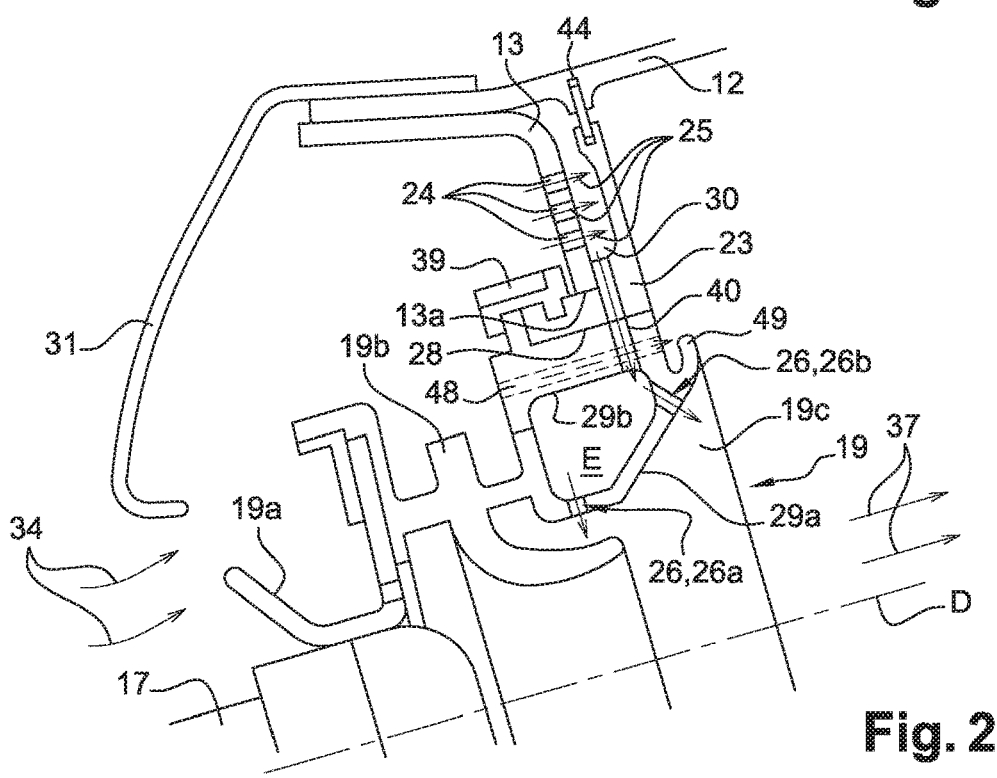
FIG. 2 is a detailed view of a deflector sector of the combustion chamber shown in FIG. 1.

To protect the bottom 13 of the combustion chamber 1 from thermal radiation generated by combustion, the combustion chamber 1 also includes at least one annular deflector 23 placed in the combustion chamber 1. The annular deflector 23 is substantially parallel to the bottom 13 of the combustion chamber 1, and faces cooling openings 24 made in the bottom 13 of the combustion chamber 1 (FIG. 2). Air, shown by the arrows 25, pass through the openings 24 and cool the deflector 23 by air impact with air coming from the compressor 4. In some embodiments, the deflector 23 is also tightly fixed to the internal and external walls 11, 12, and the cooling air 25 of the deflector 23 is redirected to the inside of the combustion chamber 1 through holes 26 in the injection devices 16.

Figure 3:
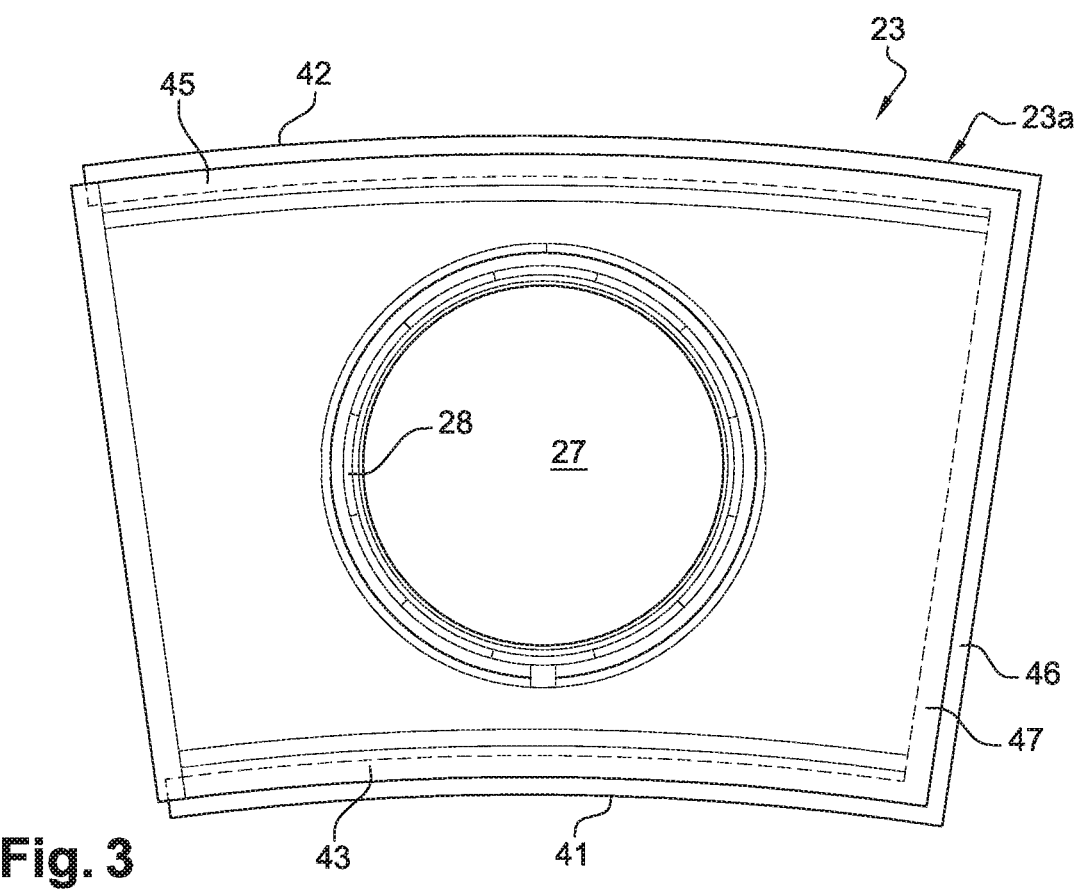
FIG. 3 is a front view of the deflector sector shown in FIG. 4.

As shown in FIG. 3, the deflector 23 is sectored and includes a plurality of sectors 23a distributed angularly around the axis C, the sectors 23a assembled in a sealed manner to each other. The number of sectors 23a is equal to the number of injection devices 16. Each sector 23a includes a circular central opening 27 delimited by an upstream-projecting peripheral shoulder 28 which is inserted into the opening 13a of the bottom 13. Each sector 23a faces the cooling opening 24 in the bottom 13. As shown in FIG. 2, a space 30 between the bottom 13 of the combustion chamber 1 and the deflector 23 has an annular shape about axis C of revolution in which the cooling air 25 of the deflector 23 circulates before flowing to the inside the combustion chamber 1 through the holes 26.

As shown in FIG. 2, the diffusion means 19c include a frustoconical bowl 29a flared downstream and surrounded by a cylindrical wall 29b which is mounted coaxially in shoulder 28. The bowl 29a and the wall 29b define an annular cavity E which is closed at its axial ends, in particular with respect to the D axis. The cavity E is supplied with cooling air 25 flowing through channels 40 for supplying air from the space 30 between the bottom 13 of the combustion chamber 1 and the deflector 23. The channels 40 extend radially with respect to the axis D of the injection device 16, through the cylindrical wall 29b on one side and the shoulder 28 on the other side. In some embodiments, the channels 40 may be substantially cylindrical and have a diameter approximately equal to the thickness of the space 30.

The cavity E is connected to holes 26. The holes 26 may include an annular row of first holes 26a extending about the axis D and formed at an upstream end of smaller diameter of bowl 29a. In some embodiments, the holes 26 may further include an annular row of second holes 26b extending about axis D and formed at a downstream end of larger diameter of the bowl 29a. The first holes 26a may have a substantially radial orientation with respect to the axis D. The second holes 26b may be inclined with respect to the axis D, from upstream to downstream towards the inside of axis D. In alternative embodiments, the cavity E may include either a first set of holes 26a or the second holes 26b.

The cylindrical wall 29b is traversed by drillings 48, or thru-holes, which extend parallel to the axis D in a thickness of the wall 29b. The drillings 48 may have an opening at a downstream end which may face an external annular flange 49 located at the downstream end of the bowl 29a with a larger diameter. In some embodiments, the drillings 48 have an opening at an upstream end. The opening at the upstream end may accept a supply of compressed air, the compressed air configured to cool by impacting the flange 49 of the bowl.

As shown in FIG. 2, the drillings 48 may be relatively long. For example, the drillings 48 may have a length five times longer than their diameter. In contrast, in some embodiments, the holes 26 and the openings 24 have a length between 1 and 3 times their diameter.

In some embodiments, the upstream ends of the drillings 48 may be located upstream of the bottom 13, and the downstream ends of the drillings may be located downstream of the bottom 13.

As shown, the shoulder 28 and the wall 29b may be fixed together by an annular fixing means 39 (coupler).

In some embodiments, the bottom 13 of the combustion chamber 1 may be covered upstream by an attached annular fairing 31 (axis C of revolution). The annular fairing 31 may have overall, in a half-longitudinal section, a C-shape with a concavity of the C-shape facing downstream. The fairing 31 may form an annular compartment 32 with the bottom 13 of the combustion chamber 1. In some embodiments, the fairing 31 may include a lumen 33 to accept the injector 17. The lumen 33 may be proximate each injection device 16 or may be an annular feature.

As shown in FIG. 1, in the half-longitudinal section, proximate each injection device 16, the compressed air flow 8 generated by the compressor 4 is separated at the outlet of the diffuser 9 into three flows. The three flows may include: (a) a central air flow 34 entering the compartment 32 via the lumen 33, (b) an internal bypass air flow 35 through the internal passage 14, and (c) an external bypass air flow 36 through the external passage 15. In some embodiments, the central air flow 34 may be divided within the compartment 32 into a first air flow 37 to supply the combustion chamber 1 through the mixers 19 and a second air flow 25 to cool sectors 23a through openings 24.

In some embodiments, the sectors 23a of deflector 23 are cooled by the impact of air jets created by the cooling air flow 25 hitting the sectors 23a of deflector 23 through the cooling orifices 24 located in the bottom 13 of the combustion chamber 1. The cooling air 25 then evacuates from the space 30 through the channels 40 and the holes 26.

In some embodiments, the sectors 23a of deflector 23 may be either tightly fixed or fixed in a sealed manner to internal and external walls 11 and 12.

Figure 4:
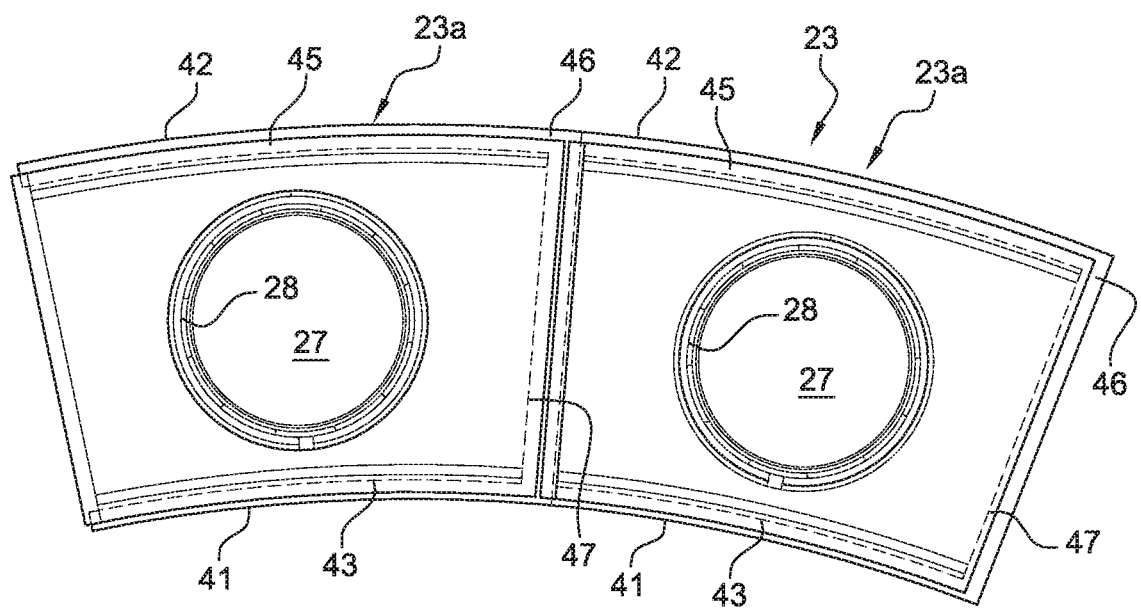
FIG. 4 is a front view of an assembly of two deflector sectors shown in FIG. 3.

As shown in FIGS. 3 and 4, each sector 23a of the deflector 23 is fixed in a sealed manner to the internal and external walls 11 and 12 via respectively internal and external circular blades 41, 42. The internal blade 41 may engage an internal groove of the internal wall 11 and an internal circumferential housing 43 of the sector 23a of deflector 23. In some embodiments, the external blade 42 may engage an external groove 44 of the external wall 12 and an external circumferential housing 45 of the sector 23a of deflector 23.

In some embodiments, the blades 41, 42 are mounted with axial and/or radial clearance in grooves 44 and housings 43, 45 to allow expansion of the combustion chamber 1 while ensuring tightness between walls 11, 12 and sectors 23a of deflector 23, during the different operating modes of the gas generator 2. For the same reasons, the deflector 23 is radially distant from the external wall 12 (respectively from the internal wall 11).

In some embodiments, the sectors 23a of deflector 23 are assembled in a sealed manner with respect to each other.

As shown in FIG. 4, the first sector 23a of a first deflector 23 is sealed to an adjacent second sector 23a of an adjacent deflector 23 via a straight radial tongue 46. The tongue 46 may engage radial grooves 47 of the first and second sectors 23a of deflectors 23. This method of fixing the deflectors, and various alternatives, are presented in application EP-A1-2012061 on behalf of the applicant.

In some embodiments, the first and second sectors 23a of deflectors 23 are spaced a predetermined distance apart to allow the expansion of the combustion chamber 1 while ensuring tightness between the two adjacent sectors 23a during the different operating regimes of the gas generator.

In some embodiments, the internal and external blades 41, 42 may be manufacturing in one-piece with the tongue 46 and form a monobloc assembly. In some embodiments, the monobloc assembly may comprise a high-temperature resistant metallic material such as a material based on nickel and cobalt. In alternative embodiments, the internal and external blades 41, 42 and tongue 46 are made independently of each other.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An annular combustion chamber, with an axis of revolution, of a turbomachine delimited by coaxial internal and external annular walls joined upstream of an air flow by a bottom of the combustion chamber substantially transverse to the internal and external walls, the combustion chamber further comprising:
   at least one annular deflector positioned in the combustion chamber, the at least one annular deflector comprising an annular wall substantially parallel to the bottom of the combustion chamber;
   at least one opening positioned in the bottom of the combustion chamber, the at least one opening positioned to be traversed by an air stream for cooling the at least one annular deflector, the air stream does not pass through the annular wall of the at least one annular deflector; and
   mounting openings proximate the bottom of the combustion chamber and the deflector for mounting an annular row of injection devices, the injection devices injecting a mixture of air and fuel into the combustion chamber;
   wherein at least part of the air stream for cooling the deflector which has passed through the at least one opening is conveyed into an enclosed annular cavity, such that only the air stream after cooling the deflector enters the annular cavity prior to exiting to the combustion chamber through holes in the injection devices.

2. The chamber according to claim 1, wherein the at least one annular deflector is fixed in a sealed manner to the internal and external walls.

3. The chamber according to claim 1, wherein the at least one annular deflector is sectored and includes a plurality of sectors distributed angularly about the axis, wherein each sector of the plurality of sectors is joined in a sealed manner to an adjacent sector.

4. The chamber according to claim 1, wherein at least one of the holes of each injection device of the injection devices has a substantially radial orientation with respect to an axis of said each injection device.

5. The chamber according to claim 1, wherein at least one of the holes of each injection device of the injection devices has an inclined orientation with respect to an axis of said each injection device.

6. The chamber according to claim 1, wherein each injection device of the injection devices comprises a casing for centering a fuel injector, an injector for injecting air, and a diffuser for diffusing an air-fuel mixture, the diffuser including a frustoconical bowl flared downstream and drilled with said holes.

7. The chamber according to claim 6, wherein the diffuser includes a cylindrical wall which passes through the at least one opening which is positioned in the bottom of chamber and of the at least one annular deflector, the cylindrical wall extending around the bowl of the diffuser defining the annular cavity in fluid communication on a first side with channels for supplying cooling air to the deflector and the annular cavity in further communication on a second side with said holes.

8. The chamber according to claim 7, wherein the annular cavity is closed at an axial end.

9. The chamber according to claim 7, wherein said channels extend between the cavity and a space between the bottom of the combustion chamber and the at least one annular deflector.

10. A turbomachine comprising the combustion chamber according to claim 1.

11. The chamber according to claim 1, wherein each injection device of the injection devices includes a diffuser for diffusing an air-fuel mixture comprising a cylindrical wall which passes through the at least one opening which is positioned in the bottom of the chamber and of the at least one annular deflector and wherein the cylindrical wall is traversed by drillings which extend parallel to the axis of revolution in the thickness of the cylindrical wall and which open at their downstream ends and upstream ends.

12. The chamber according to claim 11, wherein the drillings have a length and a diameter, the length being more than five times the diameter.

13. An annular combustion chamber, with an axis of revolution, of a turbomachine delimited by coaxial internal and external annular walls joined upstream of an air flow by a bottom of the combustion chamber substantially transverse to the internal and external walls, the combustion chamber further comprising:
   at least one annular deflector positioned in the combustion chamber, the at least one annular deflector comprising an annular wall substantially parallel to the bottom of the combustion chamber;
   at least one opening positioned in the bottom of the combustion chamber, the at least one opening positioned to be traversed by an air stream for cooling the at least one annular deflector, the air stream does not pass through the annular wall of the at least one annular deflector; and
   mounting openings proximate the bottom of the combustion chamber and the deflector for mounting an annular row of injection devices, the injection devices injecting a mixture of air and fuel into the combustion chamber,
   wherein at least part of the air stream for cooling the deflector is conveyed into an enclosed annular cavity, such that only the air stream after cooling the deflector enters the annular cavity prior to exiting to the combustion chamber through holes in the injection devices;
   wherein the at least one annular deflector is sectored and includes a plurality of sectors distributed angularly about the axis, wherein each sector of the plurality of sectors is joined in a sealed manner to an adjacent sector;

wherein each sector of the plurality of sectors is fixed in a sealed manner to the internal and external walls via an internal blade and an external blade respectively;

the internal blade engaged in a groove formed on an external surface of the internal wall and an internal housing of said each respective sector of the plurality of sectors; and the external blade engaged in a groove formed on an internal surface of the external wall and an external housing of said each respective sector of the plurality of sectors.

* * * * *